(No Model.)

C. B. CORBIN.
FISH LINE REEL.

No. 520,517. Patented May 29, 1894.

WITNESSES:
Lewie E. Flanders
Lois Moulton

INVENTOR
Charles B. Corbin
BY
Luther V. Moulton
ATTORNEY.

THE NATIONAL LITHOGRAPHING COMPANY,
WASHINGTON, D. C.

UNITED STATES PATENT OFFICE.

CHARLES B. CORBIN, OF GRAND RAPIDS, MICHIGAN, ASSIGNOR OF ONE-HALF TO WILLIAM J. CORBIN, OF SAME PLACE.

FISH-LINE REEL.

SPECIFICATION forming part of Letters Patent No. 520,517, dated May 29, 1894.

Application filed July 22, 1893. Serial No. 481,167. (No model.)

*To all whom it may concern:*

Be it known that I, CHARLES B. CORBIN, a citizen of the United States, residing at Grand Rapids, in the county of Kent and State of Michigan, have invented certain new and useful Improvements in Fish-Line Reels; and I do hereby declare the following to be a full, clear, and exact description of the invention, such as will enable others skilled in the art to which it appertains to make and use the same.

My invention relates to improvements in fish line reels, and its object is to provide the same with certain new and useful features, hereinafter more fully described, and particularly pointed out in the claims, reference being had to the accompanying drawings, in which—

Figure 1:
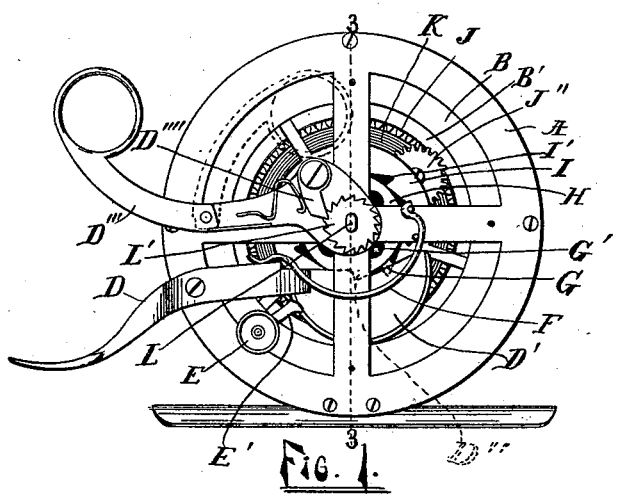
Figure 2:
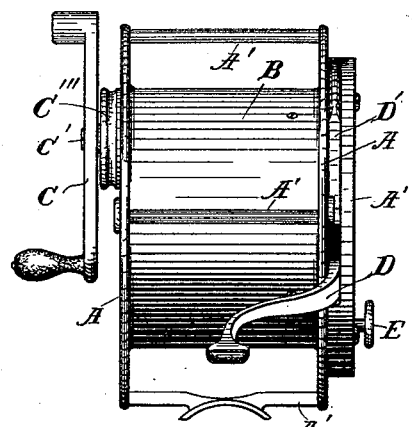
Figure 3:
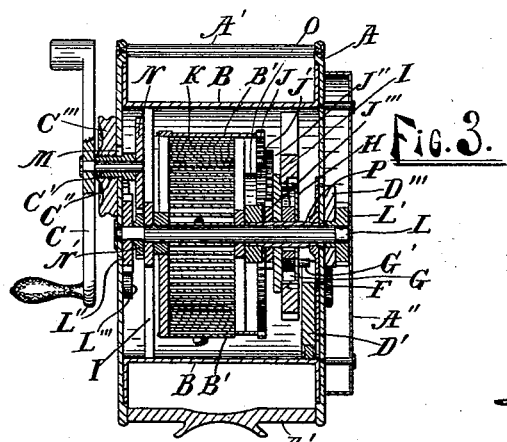
Figure 4:
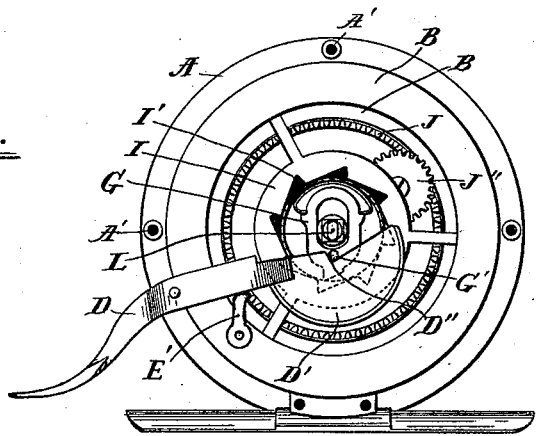
Figure 5:
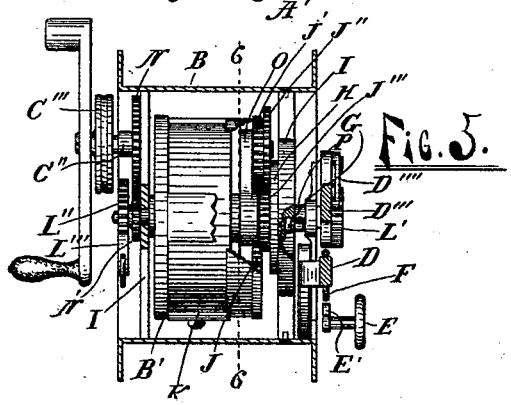
Figure 6:
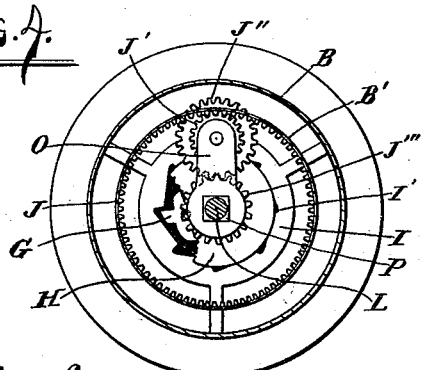

Figure 1 is an end elevation of a device embodying my invention, with a part of the case removed to show the construction. Fig. 2 is a side elevation of the same complete. Fig. 3 is a vertical section of the same on the line 3—3 of Fig. 1. Fig. 4 is a detail showing the brake and co-acting parts. Fig. 5 is a detail showing the mechanism for operating the winding drum, with portions broken away, or removed to show the construction; and Fig. 6 a vertical section on the line 6—6 of Fig. 5, showing detail of the drum operating gearing.

Like letters refer to like parts in all of the figures.

A, A, represent the heads of the case, which are connected to each other by suitable bars, or rods A', and adapted to be secured to the fishing rod. A cap A'' is attached to one of said heads A, to cover the brake and winding mechanism, the levers of which extend through a slot in the edge of said cap.

B is the drum upon which the line is wound. In the axis of this drum is a shaft L, journaled in the heads A, A, and provided at each end with oppositely acting ratchet wheels L' and L''; the wheel L'' is engaged by a fixed pawl L''', and serves to hold the shaft from turning back, as the spring K is wound by means of a lever D''', journaled on said shaft and provided with a pawl D'''' engaging the ratchet wheel L'. Said lever is provided with a joint where it passes through the slot in the cap A'', to permit of folding said lever down within said slot when out of use (see Figs. 1 and 2). The drum B has a spider I at each end, one of which is journaled on the shaft L, and the other provided with a large hub, is journaled on the pawl case H, and provided with an internal ratchet I', which is engaged by a radial spring pawl G located in said case, which case is journaled upon a fixed sleeve P, surrounding the shaft L. On the inner end of said sleeve is a laterally projecting arm O, having a stud near its end on which are journaled the gears J', J'', which gears are attached to each other to rotate in unison, and are actuated by an internal gear J, on the end of the spring case B' and engaging the gear J'. Said case is journaled on the shaft L and is rotated by the spring K, having its inner end attached to the shaft L, and its outer end attached to said case. The gear J'' engages a gear J''' fixed on the pawl case H. A brake lever D projects through the slot in the side of the cap A'', and its inner end is provided with a shoe D', which is engaged with the inner surface of the drum B, by the spring F, with sufficient force to hold said drum stationary under all ordinary strains of the spring K, on the line. The pawl G is provided with a pin G' projecting through the case H, and the inner side of the shoe D' engages said pin, and releases said pawl from the ratchet I', whenever the lever P is sufficiently depressed, and a notch D'' in said shoe engages said pin and thus prevents unwinding of the spring. A dog E' operated by a milled head E engages the lever D and holds it in engagement with said pin, as shown in Fig. 4.

N' is a pinion attached to the spider I, and N is a gear engaging the same and fixed on the inner end of a shaft C' journaled in a sleeve C'', and provided with a crank C at its outer end. Said sleeve is adjustable to and from the pinion N' in a slot M in the head A, and is secured in place by a milled nut C''' whereby said gear and pinion may be engaged or disengaged at pleasure.

The device is operated as follows: By vibrating the lever D''' the shaft L is rotated and tension put upon the spring K, the pawl and ratchet L'', L''' holding the shaft from turning back. The spring K tends to rotate the case B', which through the gears J, J', J'', J''', tends to rotate the pawl case H, which, through the pawl G tends to rotate the drum B, this is normally prevented by the pressure of the brake shoe D'. By depressing the lever D this brake resistance is more or less removed, and the spring now will wind the line with greater or less force. By fully depressing the brake lever, the pawl G is withdrawn from the ratchet I', and the drum B is wholly disconnected from the winding mechanism; thus the line will run off freely; the spring in the mean time being retained under tension as before described. If desirable the lever D may be locked in this position by the dog E; the nut C''' loosened, and the sleeve C'' moved toward the pinion N', thus engaging the gear N with said pinion, said nut being again tightened, the drum can now be operated solely by means of the crank C. Thus the drum B may be operated automatically by the spring and brake; or released to run off freely; or may be shifted to operate by the hand crank C at pleasure, thus providing a very convenient and practical device, well adapted to all the various conditions arising in the processes of fishing.

What I claim is—

1. In a fish line reel, a rotative drum, a spring to rotate the same, a pawl connecting said spring to said drum, a brake engaging said drum and in position to operatively engage said pawl and disconnect said spring from said drum and hold said spring, and a lever to actuate said brake, substantially as described.

2. In a fish line reel, a rotative drum, a spring to rotate the same a train of gearing connected to said spring, a pawl connecting said gearing to said drum, a pin in said pawl, a brake shoe engaging said drum and pin at its respective sides, a spring pressing said shoe against said drum, and a notch in said shoe engaging said pin, substantially as described.

3. In a fish line reel, a rotative drum, a spring connected to said drum by a pawl and ratchet, a pin in said pawl, a brake shoe having an operating lever and engaging said drum and pin at its respective sides, a spring pressing said shoe against said drum, a notch in said shoe engaging and holding said pin, and a dog engaging and holding said brake lever in engagement with said pin, substantially as described.

4. In a fish line reel, a rotative drum journaled on a rotative shaft, a fixed pawl engaging a ratchet wheel on said shaft, a lever pivoted on said shaft, a pawl on said lever engaging a ratchet wheel on said shaft, a spring connected at one end to said shaft, a rotative spring case connected to the other end of said spring, a fixed sleeve around said shaft, an arm on said sleeve, a gear on said spring case, a gear journaled on said sleeve and connected to said drum two gears fixed to each other and journaled on said arm and respectively engaging the gear on the spring case and the gear on the sleeve, substantially as described.

5. In a fish line reel, a rotative shaft, and means for rotating and holding the same, a pawl case rotative about said shaft, a winding drum journaled on said shaft at one end and on said pawl case at the other end, a spring attached to said shaft at one end, gearing connecting said spring and pawl case and transmitting motion from the former to the latter, a ratchet on said drum and a pawl in said case engaging said ratchet, a pin in said pawl and a spring actuated brake adapted to alternately engage said drum and said pin, substantially as described.

6. In a fish line reel, in combination with a winding drum, and spring actuated gearing to actuate said drum, a detachable connection between said gearing and drum, and means for detaching the same, a pinion on said drum, an adjustable sleeve, a shaft rotative in said sleeve, a crank on the outer end of said shaft, and a gear on the inner end of the same, said gear adapted to engage said pinion, substantially as described.

7. In a fish line reel, a case having a rotative drum, a central shaft, a pawl and ratchet to hold said shaft, a spring connected to said shaft and to said drum, a brake lever having a shoe engaging said reel, a winding lever journaled on said central shaft, a pawl on said lever engaging a ratchet on said shaft, a cap covering the inner ends of said levers and having a slot in its edge through which said levers project, and a joint in said winding lever whereby it may be folded into said slot, substantially as described.

In testimony whereof I affix my signature in presence of two witnesses.

CHARLES B. CORBIN.

Witnesses:
LUTHER V. MOULTON,
WILLIAM TAMRENRTZ.